US012585031B2

(12) United States Patent
Amini et al.

(10) Patent No.: US 12,585,031 B2
(45) Date of Patent: Mar. 24, 2026

(54) COLLABORATIVE GEOLOCATION ESTIMATION

(71) Applicant: Cisco Technology, Inc.

(72) Inventors: Peiman Amini, Fremont, CA (US);
Ardalan Alizadeh, Milpitas, CA (US);
Vishal Desai, San Jose, CA (US)

(73) Assignee: Cisco Technology, Inc., San Jose, CA
(US)

( * ) Notice: Subject to any disclaimer, the term of this
patent is extended or adjusted under 35
U.S.C. 154(b) by 465 days.

(21) Appl. No.: 18/047,899

(22) Filed: Oct. 19, 2022

(65) Prior Publication Data

US 2023/0333264 A1     Oct. 19, 2023

Related U.S. Application Data

(60) Provisional application No. 63/363,099, filed on Apr.
15, 2022.

(51) Int. Cl.
| *G01S 19/51* | (2010.01) |
| *G01S 19/45* | (2010.01) |
| G01S 19/09 | (2010.01) |
| G01S 19/14 | (2010.01) |
| G01S 19/42 | (2010.01) |

(52) U.S. Cl.
CPC .............. *G01S 19/51* (2013.01); *G01S 19/45*
(2013.01); *G01S 19/09* (2013.01); *G01S 19/14*
(2013.01); *G01S 19/42* (2013.01)

(58) Field of Classification Search
CPC .......... G01S 19/45; G01S 19/51; G01S 19/42;
G01S 19/09; G01S 19/14; G01S 5/0036

USPC .......................... 342/357.28, 357.34, 357.25
See application file for complete search history.

(56) References Cited

U.S. PATENT DOCUMENTS

| 8,971,797 | B2 * | 3/2015 | Sheynblat | ............... G01S 19/42 |
| | | | | 455/12.1 |
| 9,554,354 | B2 * | 1/2017 | Sheynblat | ................. G01S 5/14 |
| 9,645,242 | B2 * | 5/2017 | Alpert | ..................... H04W 4/02 |
| 9,838,845 | B2 * | 12/2017 | Xiao | ..................... H04W 4/025 |
| 11,792,763 | B2 * | 10/2023 | Cook | .................... H04W 72/51 |
| | | | | 455/456.1 |
| 2011/0291882 | A1 | 12/2011 | Walsh et al. | |
| 2013/0307723 | A1 | 11/2013 | Garin et al. | |
| 2015/0065159 | A1 | 3/2015 | Alpert et al. | |
| 2016/0327629 | A1 * | 11/2016 | Pandharipande | ..... G01S 5/0236 |

(Continued)

FOREIGN PATENT DOCUMENTS

| CN | 107251585 | A | * | 10/2017 | ............... G01C 5/06 |
| CN | 104981714 | B | * | 7/2018 | ............. G01S 19/05 |

(Continued)

*Primary Examiner* — Chuong P Nguyen
(74) *Attorney, Agent, or Firm* — Merchant & Gould P.C.

(57) ABSTRACT

Collaborative geolocation estimation may be provided. A
plurality of access points (APs) may receive a geolocation
estimation request from a controller. Next, one or more of
the plurality of APs may receive signals from a plurality of
satellites. The controller may then receive the signals from
the plurality of APs. The controller may determine a col-
laborative geolocation estimation using the signals, wherein,
when relative locations of the APs are available, determining
the geolocation estimation comprises applying the relative
locations. One or more of the plurality of APs may receive
the geolocation estimation from the controller.

20 Claims, 4 Drawing Sheets

(56)                    References Cited

U.S. PATENT DOCUMENTS

| | | | | |
|---|---|---|---|---|
| 2017/0127373 A1* | 5/2017 | Deshpande | ......... | H04W 12/069 |
| 2021/0157386 A1 | 5/2021 | Vegesna et al. | | |
| 2024/0107489 A1* | 3/2024 | Saha | ................... | H04W 64/00 |
| 2024/0205873 A1* | 6/2024 | Amini | ................... | G01S 5/011 |

FOREIGN PATENT DOCUMENTS

| | | | | |
|---|---|---|---|---|
| EP | 1907876 B1 * | 11/2010 | ............. | G01S 19/11 |
| EP | 3790328 A1 | 3/2021 | | |

* cited by examiner

COLLABORATIVE GEOLOCATION ESTIMATION

RELATED APPLICATIONS

This application claims priority to U.S. Provisional Patent Application 63/363,099, which was filed Apr. 15, 2022, and which is incorporated herein by reference in its entirety for any and all purposes.

TECHNICAL FIELD

The present disclosure relates generally to providing geolocation estimation.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it may also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
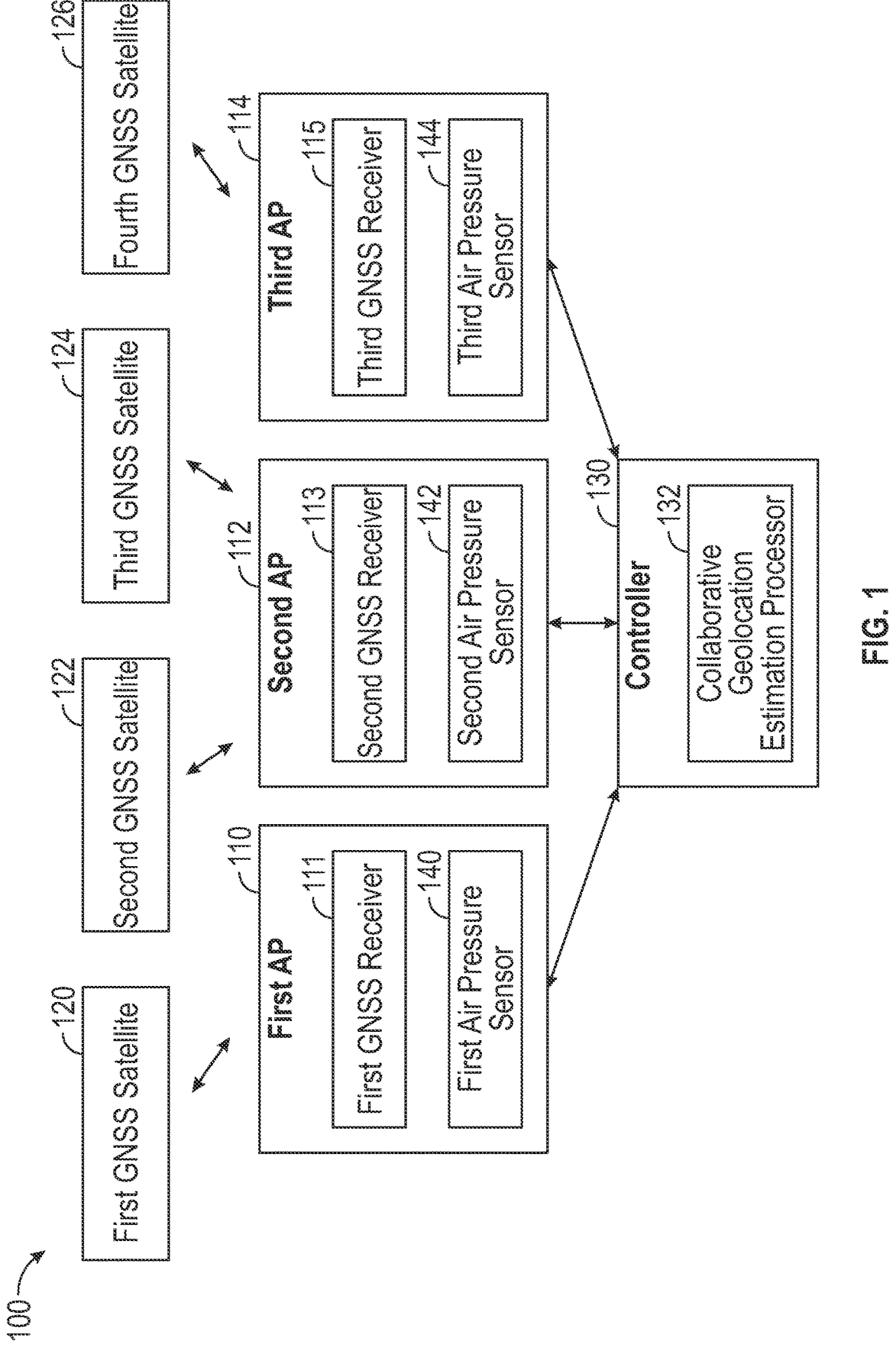
FIG. 1 is a block diagram of a collaborative geolocation estimation system for providing collaborative geolocation estimation.

Collaborative geolocation estimation may be provided. A plurality of access points (APs) may receive a geolocation estimation request from a controller. Next, one or more of the plurality of APs may receive signals from a plurality of satellites. The controller may then receive the signals from the plurality of APs. The controller may determine a collaborative geolocation estimation using the signals, wherein, when relative locations of the APs are available, determining the geolocation estimation comprises applying the relative locations. One or more of the plurality of APs may receive the geolocation estimation from the controller.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Usage of Global Navigation Satellite System (GNSS) modules in an enterprise wireless network may be challenging because Access Points (APs) may be deployed in positions (e.g., ceilings of buildings) that result in satellite signal loss and significant location estimation degradation. The degradation may occur because of building entry loss (i.e., wall and ceiling attenuation). Moreover, many APs may be located in dense building environments that may exacerbate the signal loss and degradation due to signal blockage from neighbor buildings/towers and large multipath effects. Embodiments herein may include systems and methods to address geolocation estimation using GNSS in environments that may cause satellite signal loss and location estimation degradation.

GNSS positioning may be based on trilateration, a method of determining position by measuring distances to points at known coordinates. At a minimum, trilateration may require three ranges to three known points. A Global Positioning System (GPS), on the other hand, may require four pseudoranges to four satellites. A signal may be transmitted from each satellite in the direction of the Earth. The signal may be encoded with a Navigation Message that may be read by a user's receivers. The Navigation Message may include orbit parameters (also known as a "broadcast ephemeris"), from which the receiver may compute satellite coordinates (X, Y, Z). The time of signal reception may be recorded by the receiving system using an atomic clock, and the receiving system may measure the difference in these times. The pseudorange may be the time difference multiplied by the speed of light.

Table 1 below provides a summary of symbols that may be used in describing the example embodiments:

TABLE 1

| Symbol | Meaning |
|---|---|
| $\Delta P^i$ | Residual Observation for i-th Satellite |
| $(x^i, y^i, z^i)$ | Satellite Coordinates |
| $(x_0, y_0, z_0)$ | Provisional Parameters |

TABLE 1-continued

| Symbol | Meaning |
| --- | --- |
| $\rho$ | Pseudorange |
| c | Speed of Light |
| $\Delta x$ | Change in x-Axis Receiver Location to Provisional Parameters |
| $\Delta y$ | Change in y-Axis Receiver Location to Provisional Parameters |
| $\Delta z$ | Change in z-Axis Receiver Location to Provisional Parameters |
| $\Delta \tau$ | Clock Error |
| X | x-Axis Receiver Location |
| Y | y-Axis Receiver Location |
| Z | z-Axis Receiver Location |

In general, for m number of satellites, the pseudoranges may be determined by applying equation 1 below:

$$\begin{pmatrix} \Delta P^1 \\ \Delta P^2 \\ \Delta P^3 \\ \vdots \\ \Delta P^m \end{pmatrix} = \begin{pmatrix} \dfrac{x_0 - x^1}{\rho} & \dfrac{y_0 - y^1}{\rho} & \dfrac{z_0 - z^1}{\rho} & c \\ \dfrac{x_0 - x^2}{\rho} & \dfrac{y_0 - y^2}{\rho} & \dfrac{z_0 - z^2}{\rho} & c \\ \dfrac{x_0 - x^3}{\rho} & \dfrac{y_0 - y^3}{\rho} & \dfrac{z_0 - z^3}{\rho} & c \\ \vdots & \vdots & \vdots & \vdots \\ \dfrac{x_0 - x^m}{\rho} & \dfrac{y_0 - y^m}{\rho} & \dfrac{z_0 - z^m}{\rho} & c \end{pmatrix} \begin{pmatrix} \Delta x \\ \Delta y \\ \Delta z \\ \Delta \tau \end{pmatrix} \quad (1)$$

$\Delta P^i$, the pseudorange difference or residual observation, may be the difference between the actual observation and the observation computed using the provisional parameter values for the i-th satellite. $(x^i, y^i, z^i)$ may be coordinates of the i-th satellite, and $(x_0, y_0, z_0)$ may be the provisional parameter values from the Taylor series. The receiver location (X, Y, Z) of the receiving system may be in the right hand side column vector, where $\Delta x$, $\Delta y$, and $\Delta z$ may be $\Delta x = X - x_0$, $\Delta y = Y - y_0$, and $\Delta z = Z - z_0$. Equation 1 may be written in the form shown by equation 2:

$$b = Ax + v \quad (2)$$

Equation 2 may be called the system of "normal equations". The solution to equation 2, the system of normal equations, may be based on least square error determined using equation 3 for example:

$$\hat{x} = (A^T A)^{-1} A^T b \quad (3)$$

FIG. 1 is a block diagram of a collaborative geolocation estimation system 100 for providing collaborative geolocation estimation. The collaborative geolocation estimation system 100 may include a first AP 110, a second AP 112, a third AP 114, a first GNSS satellite 120, a second GNSS satellite 122, a third GNSS satellite 124, a fourth GNSS satellite 126, and a controller 130. The first AP 110 may include a first GNSS receiver 111 and a first air pressure sensor 140, the second AP 112 may include a second GNSS receiver 113 and second air pressure sensor 142, and the third AP 114 may include a third GNSS receiver 115 and a third air pressure sensor 144. The controller 130 may include a collaborative geolocation estimation processor 132.

APs may be used to create a Wireless Local Area Network (WLAN), often in a building, and the GNSS receivers may be installed on preexisting networks of APs. For example, the first AP 110, the second AP 112, and the third AP 114 may be APs that were previously installed and did not have collaborative geolocation estimation capabilities. The first GNSS receiver 111, the second GNSS receiver 113, and the third GNSS receiver 115 may have been subsequently installed, and the first AP 110, the second AP 112, and the third AP 114 may then be capable of providing collaborative geolocation estimation services.

The first AP 110, the second AP 112, and the third AP 114 may be tagged with a position. For example, the AP tags may include a floor the AP is located on, a section of the floor the AP is located on, and the like. The controller 130 may automatically determine the position of the first AP 110, the second AP 112, and the third AP 114, or the controller 130 may receive input from a user indicating the positions. The controller 130 may communicate with the first AP 110, the second AP 112, and the third AP 114 to determine their respective positions. The GNSS receivers may be used for the identification of the geolocation of the AP by the controller 130. The locations of the APs may be used for applications such as asset tracking and automating the geolocation process.

The collaborative geolocation estimation system 100 may enable more efficient operation of routers and APs that transmit wireless connections (e.g., a 6 gigahertz (GHz) band used for wireless communication) because an Automated Frequency Coordination (AFC) system that controls the routers and APs may require the geolocation of APs. Thus, the controller may use and/or send to other systems (e.g., the AFC system) the locations of the first AP 110, the second AP 112, and the third AP 114 for applications other than the collaborative geolocation estimation. In another example, a GNSS receiver may be installed on an AFC system, and the locations of the APs may be estimated using the AFC system and the AFC system's GNSS receiver. The controller 130 may then receive the locations from the AFC system. Additionally, the locations of the APs may be used for determining the available configurations, available channels, available power tables, and the like.

Geolocation Estimation

As described above, a typical geolocation determination may require signals from a minimum of three satellites for using trilateration. However, signal loss and degradation may prevent the GNSS receivers of the APs in the collaborative geolocation estimation system 100 from receiving signals from three or more satellites. For example, the first GNSS receiver 111 may receive signals from the first GNSS satellite 120 and the second GNSS satellite 122, the second GNSS receiver 113 may receive a signal from the third GNSS satellite 124, and the third GNSS receiver 115 may receive a signal from the fourth GNSS satellite 126. Thus, the first AP 110, the second AP 112, and the third AP 114 all are not receiving signals from three or more satellites.

The collaborative geolocation estimation system 100 may use four or more satellite signals received at the first AP 110, the second AP 112, and/or the third AP 114 to determine a geolocation estimation. The collaborative geolocation estimation system 100 may determine a geolocation estimation for any device connected to the network associated with the APs. For example, a mobile device connected to the network may request a geolocation estimation, and the collaborative geolocation estimation system 100 may initiate the geolocation estimation for the mobile device.

The collaborative geolocation estimation system 100 may use signal level integration or measurement level integration to determine the geolocation estimation. However, signal level integration may require a higher complexity and more data transmission, so the collaborative geolocation estimation system 100 may primarily perform or otherwise prefer measurement level integration. The collaborative geolocation estimation system 100 may encounter multiple sources of error (e.g., receiver clock error), and the collaborative geolocation estimation system 100 may address the sources of error by using a minimum of four pseudorange measurements (for four unknowns X, Y, Z and clock error).

The first AP 110, the second AP 112, and the third AP 114 may send all received satellite signals to the controller 130. Once the controller 130 receives enough signals from the APs, the controller may perform trilateration and solve the least square equation (e.g., equation 3 above) to determine the geolocation of the APs.

When performing trilateration, the controller may determine the AP with the greatest number of received satellite signals and may assign the AP as the primary node. The controller 130 may use each signal received by the primary node from the GNSS satellites to use the greatest number of signals from a single node. Using the signals from a single node may allow the controller 130 to calculate the estimated geolocation with higher precision, less error, and the like.

Figure 2:
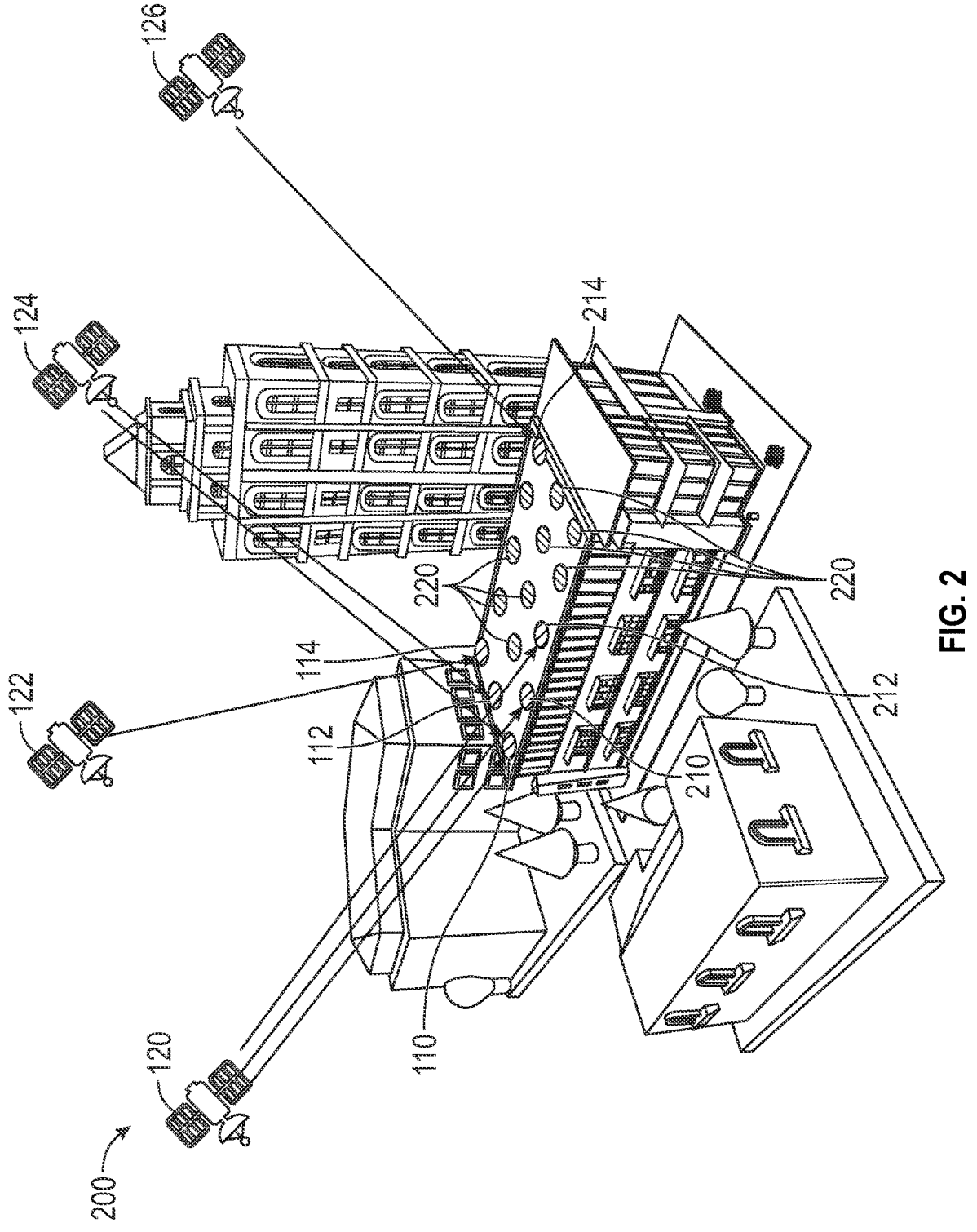
FIG. 2 is a diagram of an operating environment for providing collaborative geolocation estimation.

FIG. 2 is a diagram of an operating environment 200 for providing collaborative geolocation estimation. In FIG. 2, the first AP 110 receives a signal from the first GNSS satellite 120 and the third GNSS satellite 124, the second AP 112 receives a signal from the third GNSS satellite 124, and the third AP 114 receives a signal from the first GNSS satellite 120. The operating environment 200 may also include a fourth AP 210, a fifth AP 212, a sixth AP 214, and other APs 220. The fourth AP 210 receives a signal from the first GNSS satellite 120, the fifth AP 212 receives a signal from the first GNSS satellite 120, the sixth AP 216 receives a signal from the fourth GNSS satellite 126, and the other APs 220 do not receive a signal from any satellite. Therefore, the first AP 110 may receive two signals, the greatest number of signals received, and the controller 130 may assign the first AP 110 as the primary node.

The controller 130 may use the signals the primary node AP received in the trilateration calculation to use the greatest number of signals from a single node for the calculation. For example, even though the first AP 110, the fourth AP 210, and the fifth AP 212 receive a signal from the first GNSS satellite 120, the controller 130 may use the signal the first AP 110 receives from first GNSS satellite 120 the $(X^1, Y^1, Z^1)$ values to be inserted into equation 1. The corresponding pseudorange the controller 130 calculates, via the collaborative geolocation estimation processor 132 for example, may be used for $\Delta P^1$.

Similarly, even though the first AP 110 and the second AP 112 both receive a signal from the third GNSS satellite 124, the controller 130 may use the signal the first AP 110 receives from the third GNSS satellite 124 because the first AP 110 is the primary node. The controller 130 may use the signal the first AP 110 receives from the third GNSS satellite 124 for the $(X^3, Y^3, Z^3)$ values to be inserted into equation 1. The corresponding pseudorange the controller 130 calculates may be used for $\Delta P^3$.

The controller 130 may use satellite signals the primary node does not receive from one of the other APs for the remaining variables in the equation. For example, the controller 130 may require signals from four satellites before using equation 1, and the controller 130 is only using the signals from two satellites received from the assigned primary node, the first AP 110. The controller 130 may also use signals received from more satellites to increase accuracy. In the example illustrated by FIG. 2, the third AP may send the signal received from the second GNSS satellite 122 to the controller 130. The controller 130 may use the signal for $(X^2, Y^2, Z^2)$ values to be inserted into equation 1, and the controller 130 may calculate the corresponding pseudorange to be used for $\Delta P^2$. Similarly, the sixth AP 214 may send the signal received from the fourth GNSS satellite 126 to the controller 130. The controller 130 may use the signal for the $(X^4, Y^4, Z^4)$ values to be input into equation 1, and the controller 130 may calculate the corresponding pseudorange to be used for $\Delta P^4$.

When the relative locations of APs are known, for example by wireless localization or some other determination by the controller 130, the controller may adjust the provisional parameter values $(X_0, X_0, Z_0)$ based on the relative locations of the APs. When there is no AP relative location information, the controller 130 may not adjust the provisional parameter values. In some embodiments, the controller may assume each AP has the same location, for example the location of the primary node $\Delta P$.

GNSS Receiver Scheduling

The collaborative geolocation estimation system 100 may also create a GNSS receiver schedule to increase the success rate, accuracy, speed, and the like of determining geolocation. For example, the controller 130 may determine the GNSS receiver schedule. The GNSS receiver schedule may be followed by the GNSS receivers (e.g., the first GNSS receiver 111, the second GNSS receiver 113, and the third GNSS receiver 115), and the GNSS receiver schedule may allow the GNSS receivers to reduce the number of unsuccessful geolocation estimates, due to APs located in poor received signal power for example.

The controller 130 may first send any GNSS location requests to all APs in the collaborative geolocation estimation system. The controller 130 may sort the GNSS location requests, and therefore determine the GNSS receiver schedule, based on first time to fix, carrier-to-noise ratio (C/N0), the number of satellites, and the like. This process may be done initially and may not require frequent updates.

The GNSS receiver schedule determined by the controller may allow the strongest receiver to begin estimating the location first. The GNSS receiver schedule may then allow the next strongest receiver to begin estimating the location after the fix of the previous one, and so on. In each step, ephemeris data may be collected by the GNSS receiver estimating the location and send the data to the controller 130. The controller 130 may send the ephemeris data to the other APs, and the APs with weaker receivers may use the collected ephemeris data to estimate the respective location. The satellite ephemeris data may provide faster first time to fix for the GNSS receivers and may improve the sensitivity of the GNSS receivers for course acquisition. Therefore, the APs that are in borderline of C/N0 and/or may not be getting a fix may estimate their location with the ephemeris information shared from other APs.

Detecting AP Location Estimation Error

The collaborative geolocation estimation system 100 may also reduce error in the location estimations. The error may occur from the reflection of satellite signals and the like. For example, a reflected signal may arrive later than a line-of-sight signal, and the controller 130 may estimate a delay time that may include time and/or pseudorange error from the satellite sending the signal. The collaborative geolocation estimation system 100 may utilize dilution of precision as a metric to estimate the accuracy of a GNSS receiver, because the reflected signals may have a higher or lower power compared to a direct signal. For example, for an AP attached to a ceiling, a reflected signal that is received through window may be stronger than a direct signal received through the roof.

The collaborative geolocation estimation system 100 may also reduce error by collecting and storing the estimated time delay of each satellite signal received by each GNSS receiver associated with an AP in the controller 130. The stored list may consist of satellite names and corresponding psuedoranges. The collaborative geolocation estimation system 100, via the controller 130 for example, may then calculate the mean and variance of the pseudoranges for each satellite among all APs. The controller 130 may compare the expected psuedoranges with psuedoranges determined from signals received and used for location estimation. Each AP may be tested for all satellites. The collaborative geolocation estimation system may calculate a Z-Score and consider 2 or 3-sigma thresholds.

GNSS and Air Pressure Joint Location Estimation

As described above, the first AP 110, the second AP 112, and the third AP 114 may be tagged with a position. For example, the AP tags may include a floor the AP is located on, a section of the floor the AP is located on, and the like. The controller 130 may automatically determine the position of the first AP 110, the second AP 112, and the third AP 114. The controller 130 may communicate with the first AP 110, the second AP 112, and the third AP 114 to determine their respective positions. For example, the first air pressor sensor 140, the second air pressure sensor 142, and the third air pressure sensor 144 may be used to identify the height of the first AP 110, the second AP 112, and the third AP 114 respectively from a predefined point (e.g., the ground, the location of a system). Thus, the controller 130 may use the air pressure readings to determine the locations of the first AP 110, the second AP 112, and the third AP 114 more accurately. In some embodiments, the controller 130 may compare the geolocation estimation to the height estimation to determine if the geolocation estimation is accurate or invalid.

Geolocation Propagation

In some embodiments, only a subset of APs may have GNSS capabilities (e.g., have a GNSS receiver). However, in certain deployments, each AP may need to determine its own geolocation to operate in standard power. Therefore, the collaborative geolocation estimation system 100 may use the subset of APs that have GNSS capabilities to determine the location of all of the APs. The collaborative geolocation estimation system 100 may determine which APs are located in the same location (e.g., a building). The collaborative geolocation estimation system 100 may then propagates GNSS location inputs to APs located close together with a 2-sigma uncertainty.

The collaborative geolocation estimation system may use a link layer discover protocol and/or other protocols to identify if APs are on the same switch. The APs on the same switch may communicate using wireless communications and may use free-space path loss to reduce the uncertainty of the relative locations based on the inverse path loss. For APs that are connected to different switches but are wireless neighbors, the collaborative geolocation estimation system 100 may check if the APs are located close together using a barometer and/or manual input and computing uncertainty based on free-space path loss.

In some embodiments, GNSS data, such as IQ samples, pseudorange, Carrier phase measurement, measured Doppler shift, Carrier phase lock-time counter, Carrier-to-noise density ratio, estimated pseudorange measurement standard, estimated carrier phase measurement standard, and/or estimated Doppler-shift measurement standard may be combined in one AP or a central device (e.g., the controller 130) to re-estimate the location of APs.

Distances between APs (including APs that have a GNSS receiver and APs that are not capable of geolocation estimation) may be estimated by any of the ranging and locationing methods such as the Institute of Electrical and Electronics Engineers (IEEE) 802.11az (Time of Arrival (ToA) estimation), IEEE 802.11mc (Wi-Fi Round Trip Time (RTT) and Fine Timing Measurement (FTM)), High Accuracy Distance Measurement (HADM), Ultra-Wideband (UWB) Two Way Ranging (TWR), a Time Difference of Arrival (TDOA), radar, and/or Lidar.

Figure 3:
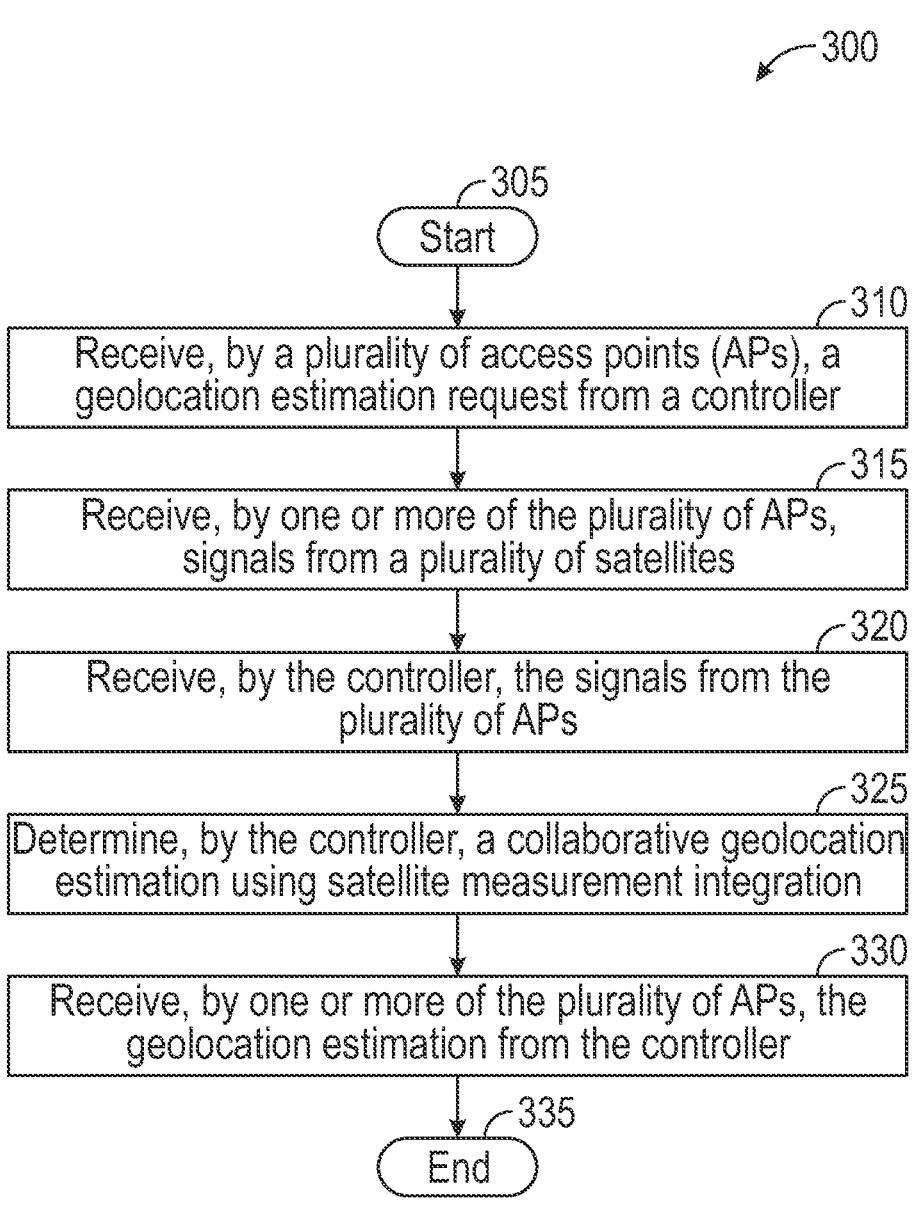
FIG. 3 is a flowchart of a method for providing collaborative geolocation estimation.

FIG. 3 is a flowchart of a method 300 for providing collaborative geolocation estimation. The method 300 may begin at starting block 305 and proceed to operation 310. In operation 310 a plurality of APs may receive a geolocation estimation request from a controller. For example, the controller 130 may send the geolocation estimation requests to the first AP 110, the second AP 112, the third AP 114, the fourth AP 210, the fifth AP 212, the sixth AP 214, and/or the other APs 220. The controller 130 may send the geolocation estimation request to the APs in response to receiving the geolocation estimation request from a device connected to the network associated with the APs.

In operation 315, one or more of the plurality of APs may receive signals from a plurality of satellites. For example, the first AP 110, the second AP 112, the third AP 114, the fourth AP 210, the fifth AP 212, and/or the sixth AP 214 may receive signals, via the associated GNSS receivers for example, from one or more satellites, such as the first GNSS satellite 120, the second GNSS satellite 122, the third GNSS satellite 124, and the fourth GNSS satellite 126. The APs may receive different amounts of signals, due to the position of the AP and the interference between the satellites for example.

In operation 320, the controller may receive the signals from the plurality of APs. For example, the controller 130, may receive the signals the first AP 110, the second AP 112, the third AP 114, the fourth AP 210, the fifth AP 212, and/or the sixth AP 214 receive in operation 315.

In operation 325, the controller may determine a collaborative geolocation estimation using satellite measurement integration. For example, the controller 130 may determine the collaborative geolocation estimation. The controller 130 may perform the processes described above with respect to FIG. 1 and FIG. 2 to perform the collaborative geolocation estimation. For example, the controller 130 may determine a primary node of the APs that receives the most signals and the signals received by the primary node in the collaborative geolocation estimation. Additionally, when relative locations of the APs are available, the controller 130 may apply the relative locations to the satellite measurement integration.

In operation 330, one or more of the plurality of APs may receive the geolocation estimation from the controller. For example, the controller may send the geolocation estimation to the first AP 110. In an example, one of the APs, such as the first AP 110, that receives the geolocation estimation may send the geolocation estimation to the device that requested the geolocation estimation. In another example, the controller 130 may send the geolocation estimation to the device directly. The method 300 may conclude at ending block 335.

Figure 4:
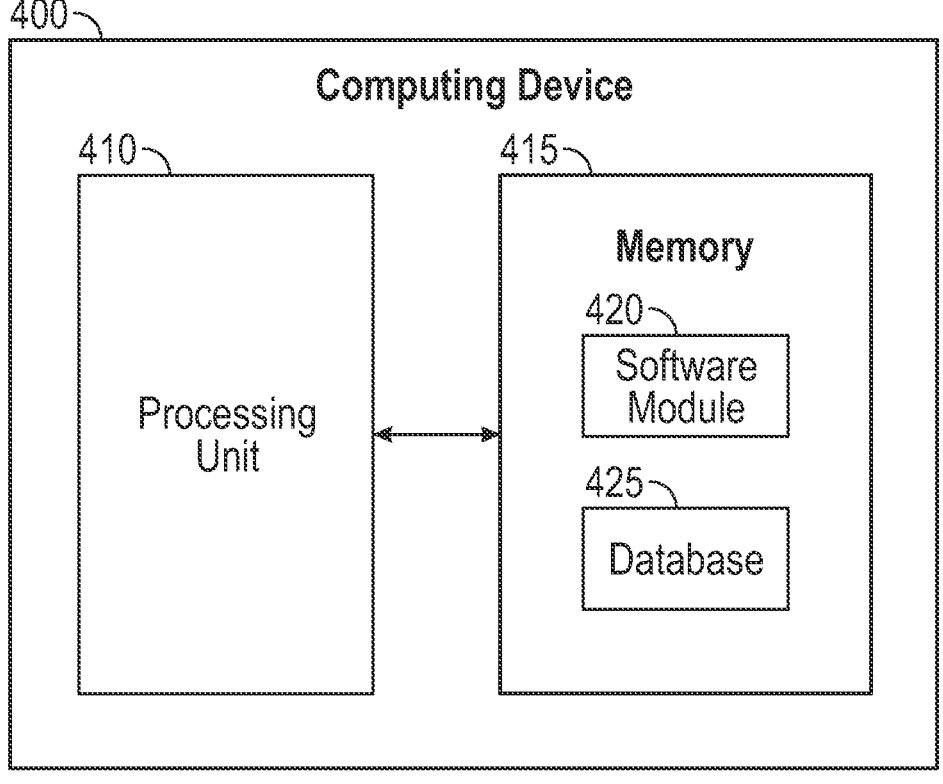
FIG. 4 is a block diagram of a computing device.

FIG. 4 is a block diagram of a computing device. As shown in FIG. 4, computing device 400 may include a processing unit 410 and a memory unit 415. Memory unit 415 may include a software module 420 and a database 425. While executing on processing unit 410, software module 420 may perform, for example, processes for providing collaborative geolocation estimation as described above with respect to FIG. 1, FIG. 2, and FIG. 3. Computing device

400, for example, may provide an operating environment for the first AP 110, the second AP 112, the third AP 114, the first GNSS satellite 120, the second GNSS satellite 122, the third GNSS satellite 124, the fourth GNSS satellite 126, the controller 130, the fourth AP 210, the fifth AP 212, the sixth AP 214, the other APs 220, and/or any other system described herein. The first AP 110, the second AP 112, the third AP 114, the first GNSS satellite 120, the second GNSS satellite 122, the third GNSS satellite 124, the fourth GNSS satellite 126, the controller 130, the fourth AP 210, the fifth AP 212, the sixth AP 214, the other APs 220, and/or any other system described herein may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The invention claimed is:
1. A method comprising:
receiving, by a plurality of access points (APs), a geolocation estimation request from a controller;
receiving, by one or more of the plurality of APs, signals from a plurality of satellites;
receiving, by the controller, the signals from the plurality of APs, wherein each of the one or more of the plurality of APs send the signals received from the plurality of satellites to the controller;
determining, by the controller, a collaborative geolocation estimation of a device using the signals received from the one or more of the plurality of APs, wherein, when relative locations of the plurality of APs with respect to the controller are available, determining the geolocation estimation comprises applying the relative loca- tions to adjust provisional parameter values of the geolocation estimation; and receiving, by one or more of the plurality of APs, the geolocation estimation from the controller.

2. The method of claim 1, further comprising sending, by the one or more of the plurality of APs, the geolocation estimation to a device connected to a network associated with the APs.

3. The method of claim 1, further comprising:

determining, by the controller, a primary node from the plurality of APs, and wherein determining, by the controller, the collaborative geolocation estimation comprises using the signals received by the primary node.

4. The method of claim 1, wherein receiving, by one or more of the plurality of APs, signals from the plurality of satellites comprises Global Navigation Satellite System (GNSS) receivers associated with the one or more of the plurality of APs receiving the signals.

5. The method of claim 4, further comprising:

determining, by the controller, a receiver order of the GNSS receivers, wherein:

the receiver order is based on any of (i) a first time to fix, (ii) a carrier-to-noise ratio, (iii) a number of satellites sending signals to the GNSS receivers, and (iv) any combination of (i)-(iii), and receiving, by the plurality of APs, the geolocation estimation request from the controller includes the plurality of APs receiving the geolocation estimation request in an order based on the receiver order.

6. The method of claim 1, further comprising:

determining, by the controller, the relative locations of the APs based at least in part on air pressure readings by air pressure sensors associated with the APs.

7. The method of claim 1, further comprising:

determining, by the controller, a geolocation estimation error by:

collecting an estimated time delay of each satellite signal received;

calculating a mean and a variance of expected pseudoranges for the plurality of satellites; and comparing determined pseudoranges and the expected pseudoranges of the satellites, wherein determining, by the controller, the collaborative geolocation estimation includes determining the determined pseudoranges.

8. A system comprising:

a memory storage; and a processing unit coupled to the memory storage, wherein the processing unit is operative to:

send a geolocation estimation request to a plurality of access points (APs);

receive satellite signals from the plurality of APs, wherein each of the plurality of APs send the signals received from the plurality of satellites to the controller;

determine a collaborative geolocation estimation of a device using the satellite signals received from the plurality of APs, wherein, when relative locations of the plurality of APs with respect to the controller are available, determining the geolocation estimation comprises applying the relative locations to adjust provisional parameter values of the geolocation estimation; and send the geolocation estimation to one or more of the plurality of APs.

9. The system of claim 8, wherein the processing unit is further operative to, send the geolocation estimation to a device connected to a network associated with the plurality of APs.

10. The system of claim 8, wherein the processing unit is further operative to, determine a primary node from the plurality of APs, wherein to determine the collaborative geolocation estimation comprises using the satellite signals received by the primary node.

11. The system of claim 8, wherein to receive satellite signals from the plurality of APs comprises to receive the satellite signals from Global Navigation Satellite System (GNSS) receivers associated with the one or more of the plurality of APs receiving the signals.

12. The system of claim 11, wherein the processing unit is further operative to, determine a receiver order of the GNSS receivers, wherein:

the receiver order is based on any of (i) a first time to fix, (ii) a carrier-to-noise ratio, (iii) a number of satellites sending signals to the GNSS receivers, and (iv) any combination of (i)-(iii), and to send the geolocation estimation request includes to send the geolocation estimation request to the plurality of APs in an order based on the receiver order.

13. The system of claim 12, wherein the processing unit is further operative to, determine a geolocation estimation error, including to:

collect an estimated time delay of each satellite signal received;

calculate a mean and a variance of expected pseudoranges for a plurality of satellites associated with the satellite signals; and compare determined pseudoranges and the expected pseudoranges of the satellites, wherein to determine the collaborative geolocation estimation includes determining the determined pseudoranges.

14. A computer-readable medium that stores a set of instructions which when executed perform a method executed by the set of instructions comprising:

receiving, by a plurality of access points (APs), a geolocation estimation request from a controller;

receiving, by one or more of the plurality of APs, signals from a plurality of satellites;

receiving, by the controller, the signals from the plurality of APs, wherein each of the one or more of the plurality of APs send the signals received from the plurality of satellites to the controller;

determining, by the controller, a collaborative geolocation estimation of a device using the signals received from the one or more of the plurality of APs, wherein, when relative locations of the plurality of APs with respect to the controller are available, determining the geolocation estimation comprises applying the relative locations to adjust provisional parameter values of the geolocation estimation; and receiving, by one or more of the plurality of APs, the geolocation estimation from the controller.

15. The computer-readable medium of claim 14, further comprising sending, by the one or more of the plurality of APs, the geolocation estimation to a device connected to a network associated with the APs.

16. The computer-readable medium of claim 14, further comprising:

determining, by the controller, a primary node from the plurality of APs, wherein determining, by the controller, the collaborative geolocation estimation comprises using the signals received by the primary node.

17. The computer-readable medium of claim 14, wherein receiving, by one or more of the plurality of APs, signals from the plurality of satellites comprises Global Navigation Satellite System (GNSS) receivers associated with the one or more of the plurality of APs receiving the signals.

18. The computer-readable medium of claim 17, further comprising:

determining, by the controller, a receiver order of the GNSS receivers, wherein:

the receiver order is based on any of (i) a first time to fix, (ii) a carrier-to-noise ratio, (iii) a number of satellites sending signals to the GNSS receivers, and (iv) any combination of (i)-(iii), and receiving, by the plurality of APs, the geolocation estimation request from the controller includes the plurality of APs receiving the geolocation estimation request in an order based on the receiver order.

19. The computer-readable medium of claim 14, further comprising:

determining, by the controller, the relative locations of the APs based at least in part on air pressure readings by air pressure sensors associated with the APs.

20. The computer-readable medium of claim 14, further comprising:

determining, by the controller, a geolocation estimation error by:

collecting an estimated time delay of each satellite signal received;

calculating a mean and a variance of expected pseudoranges for the plurality of satellites; and comparing determined pseudoranges and the expected pseudoranges of the satellites, wherein determining, by the controller, the collaborative geolocation estimation includes determining the determined pseudoranges.

* * * * *